United States Patent [19]

Ludwig

[11] 4,002,807
[45] Jan. 11, 1977

[54] ALKALI METAL, SULFUR BATTERY OR CELL WITH SINGLE PHASE SULFUR ELECTRODE

[75] Inventor: Frank A. Ludwig, Southfield, Mich.

[73] Assignee: Ford Motor Company, Dearborn, Mich.

[22] Filed: Sept. 30, 1975

[21] Appl. No.: 618,171

[52] U.S. Cl. .................................. 429/104; 429/105
[51] Int. Cl.² ........................................ H01M 43/00
[58] Field of Search ................ 136/6 F, 6 FS, 6 LF, 136/20, 100 R, 83 R, 137; 429/104, 105, 102

[56] References Cited

UNITED STATES PATENTS

| | | | |
|---|---|---|---|
| 3,488,221 | 1/1970 | Shimotake et al. | 136/20 |
| 3,531,324 | 9/1970 | Fischer et al. | 136/6 F |
| 3,884,715 | 5/1975 | Gay et al. | 136/6 F |

*Primary Examiner*—Anthony Skapars
*Attorney, Agent, or Firm*—Roger L. May; Keith L. Zerschling

[57] ABSTRACT

An improved secondary battery or cell of the type having (A) one or more anodic reaction zones containing a molten alkali metal reactant-anode in electrical contact with and external circuit, (B) one or more cathodic reaction zones containing (i) a cathodic reactant which, when the battery or cell is in the theoretically fully charged state, consists of sulfur and which, when the battery or cell is at least partially discharged, is selected from the group consisting of (a) a composition comprising a molten polysulfide salt of said anodic reactant and (b) a composition comprising molten sulfur and molten sulfur saturated polysulfide salts of said anodic reactant and (ii) an electrode of porous conductive material which is at least partially immersed in said cathodic reactant, and (C) a cation-permeable barrier to mass liquid transfer interposed between and in contact with said anodic and cathodic reaction zones, said porous, conductive material being in electrical contact with both said cation-permeable barrier and an external circuit. The improvement comprises increasing the charge/discharge capacity of the battery or cell by dissolving in the cathodic reactant an additive which comprises either (1) an element which will react with molten sulfur to form a polysulfide salt which is soluble in and forms a liquid solution with both sulfur and alkali metal polysulfide salts or (2) a polysulfide salt of said element which is soluble in and forms a liquid solution with both sulfur and alkali metal polysulfide salts.

7 Claims, 1 Drawing Figure

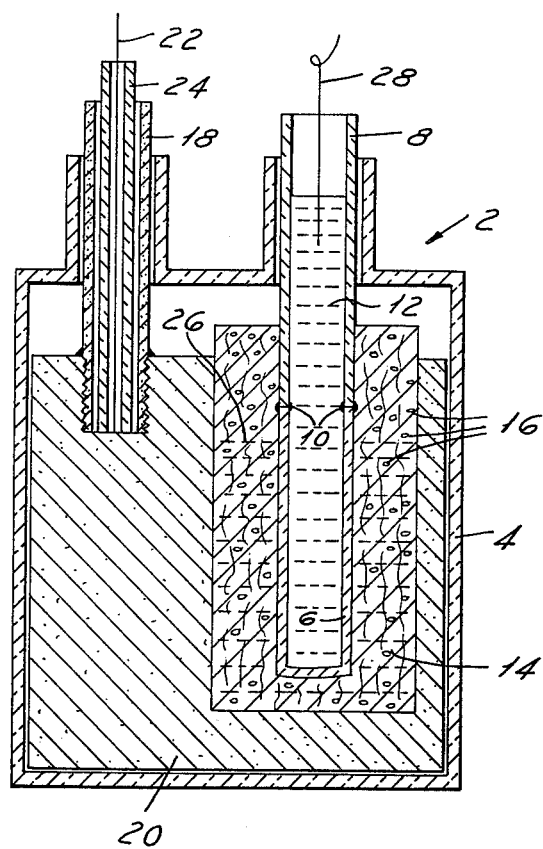

ALKALI METAL, SULFUR BATTERY OR CELL WITH SINGLE PHASE SULFUR ELECTRODE

The invention herein described was made in the course of or under a contract or subcontract thereunder with the National Science Foundation.

This application relates to an improved secondary battery or cell of increased capacity.

More particularly, this application relates to an improved secondary battery or cell of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

This application still more particularly relates to an improved sodium-sulfur cell or battery of increased capacity.

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising a liquid electrolyte, e.g., sulfur or a mixture of sulfur and molten polysulfide, which is electrochemically reversibly reactive with said anodic reactant, and (b) a conductive electrode which is at least partially immersed in said cathodic reactant; and (3) a solid electrolyte comprising a cation-permeable barrier to mass liquid transfer interposed between and in contact with said anodic and cathodic reaction zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polusulfide ions are formed by charge transfer on the surface of the porous electrode by reaction of the cathodic reactant with electrons conducted through the porous electrode from the external circuit. Because the ionic conductivity of the liquid electrolyte is less than the electronic conductivity of the porous electrode material, it is desirable during discharge that both electrons and sulfur be applied to and distributed along the surface of the porous conductive material in the vicinity of the cation-permeable solid electrolyte. When the sulfur and electrons are so supplied, polusulfide ions can be formed near the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus, electrons are removed from the alkali metal polysulfide by charge transfer at the surface of the porous electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the porous electrode, charge transfer is inhibited and the charging process is greatly hindered or terminated. Thus, in order to improve the rechargeability of a cell of this type it is necessary not only to supply polysulfide to the surface of the porous electrode in the vicinity of the cation-permeable membrane, but also to remove sulfur therefrom.

U.S. Pat. No. 3,811,493 and U.S. patent application Ser. No. 545,048 filed Jan. 29, 1975 both disclose energy conversion device designs which allow or promote improved mass transportation of reactants and reaction products to and from the vicinity of the solid electrolyte and the porous electrode during both discharge and charge. In the device disclosed in the patent and ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which in turn transfers electrons to or from the reactants.

The improvement disclosed in the patent application comprises designing the cathodic reaction zone of the device such that there are a plurality of channels and/or spaces within said zone which are free of porous conductive electrodes and which are thus adapted to allow free flow of the cathodic reactants during operation of the device. This flow results from free connection within the channels and/or spaces and from wicking of cathodic reactants within the conductive porous material.

U.S. patent application Ser. No. 567,464 filed Apr. 14, 1975 in the name of Robert Minck et al discloses an improved method for recharging secondary batteries or cells of the above-described type. The process involves maintaining a temperature gradient within the cathodic reaction zone during recharging such that the temperature of the cathodic reactants in a first region adjacent the solid electrolyte or cation-permeable barrier is sufficiently higher than the temperature of said reactants in a second region not adjacent the barrier such that sulfur in the first region boils and is transported to said second region where it condenses.

The prior art designs disclosed and claimed in the aforementioned U.S. patent and in Ser. No. 545,048 are effective in promoting distribution of reactants during both discharge and charge. However, even with these improved designs it is difficult to recharge the cells or batteries at high rates. The process of Ser. No. 567,464 overcomes some recharging problems associated with the above discussed devices, but requires heating means within or adjacent the cathodic reaction zone to create a temperature gradient and the cell or battery contains no open passageways for vapor transfer, the vapor having to pass through molten reactants in the course of being transferred within the cell.

The improvement of this invention provides an alternative to the above devices.

BRIEF DESCRIPTION OF THE INVENTION

The improvement of this invention is based on the principle that the addition of a third substance to a system of two partially miscible liquid components increases the mutual solubility of the two components if the added substance dissolves in both liquids. Thus, the improvement of this invention involves dissolving in the cathodic reactant of the secondary battery or cell an additive which is soluble in and forms a liquid solution with both sulfur and alkali metal polysulfide salts. Since the sulfur and alkali metal polysulfide salts are partially miscible and the additive dissolves in each, the mutual solubility of the sulfur and polysulfide salt phases is increased. Because of this increased mutual solubility elemental sulfur does not form at the electrode surface near the solid electrolyte during charging and, as a result, the battery or cell can be recharged much more efficiently than prior art devices.

The invention will be more fully understood after reading the following detailed description thereof in conjunction with the drawing which shows a vertical cross-sectional view of a test cell.

DETAILED DESCRIPTION OF THE INVENTION

Description of the Device to Which Improvement Applies

The secondary or rechargeable electrical conversion devices to which the improvement of this invention applies, and various components thereof, are disclosed in the following United States patent, the disclosures of which are incorporated herein by reference: U.S. Pat. Nos. 3,404,035; 3,404,036; 3,413,150; 3,446,677; 3,458,356; 3,468,709; 3,468,719; 3,476,220; 3,475,223; 3,475,225; 3,535,163; 3,719,531 and 3,811,493.

As mentioned above, the secondary batteries or cells to which the improvement of this invention applies comprise generally: (1) an anodic reaction zone containing a molten alkali metal reactant-anode in electrical contact with an external circuit; (2) a cathodic reaction zone including an electrode of porous conductive material and in which, during cell discharge, a cathode reactant forms polysulfide ions which react with cations of said alkali metal to form reduced alkali metal polysulfide salts which at least partially fill said porous electrode; and (3) a cation-permeable barrier to mass liquid transfer interposed between and in contact with said anodic and cathodic reaction zones, said porous conductive material being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reaction may also be viewed as the anode proper or conductor through which the electron flow to the external circuit is achieved. A cell component of this type is conventional referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant in the cells to which the improvement of this invention applies in sulfur. It has been the practice in the past for said sulfur to be included in said cathodic reaction zone in a molten state. Thus, as the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the porous electrode in the vicinity of the solid ceramic electrolyte. Since sulfur is nonconductive, the presence of elemental sulfur on the porous electrode could cause difficulty in continuing the recharging process. However, when the mole fraction of sulfur in the melt is between about 0.60 and about 0.72, i.e., the single phase region, the sulfur which forms on the surface of the porous electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltage becomes constant.

As charging of the cell or battery continues, the sulfur saturated polysulfide will no longer react with elemental sulfur deposited on the porous electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on porous electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrates an unusually high resistance to attach by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators or solid electrolytes are bi- or multi-metal oxides. Among the polycrystalline bi- or multi-metal oxides most useful in the devices to which the process of this invention applies are those in the family of Beta-alumina all of which exhibit a generic crystalline structures which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials useful as reaction zone separators or solid electrolyte are the following:

1. Standard Beta-type-alumina which exhibits the above-discussed crystalline structure comprising a series of layers of aluminum oxide held apart by layers of linear Al—O bond chains with sodium occupying sites between the aforementioned layers and columns. Beta-type-alumina is formed from compositions comprising at least about 80% by weight, preferably at least about 85% by weight of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline is B''-alumina which may be represented by the formula $Na_2O \cdot 6Al_2O_3$. It will be noted that the B'' crystalline form of Beta-type-alumina contains approximately twice as much soda (sodium oxide) per unit weight of material as does the Beta-alumina. It is the B''-alumina crystalline structure which is preferred for the formation of solid electrolytes or reaction zone separators for the device to which the improvement of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as result of and electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode or porous conductive material is in electrical contact with the cation-permeable barrier and an external circuit. The conductive material is of significantly greater surface area than a solid cathode and may comprise any porous material which is electronically conductive and which is resistant to attach by reactants within the cathodic reaction zone. Among the materials which may be employed are felts or foams of graphite or vitreous carbons.

While the secondary cells or batteries to which the improvement of this invention is applicable may have a number of different configurations, several of which are disclosed in the above-incorporated patents, a preferred configuration comprises: (1) an anodic reaction zone disposed in the center of said cell and containing an anodic reactant-anode which is in electrical contact with an external circuit; (2) a cation-permeable barrier to mass liquid transfer surrounding said anodic reaction zone; and (3) a cathodic reaction zone surrounding said barrier, said zone including an electrode of porous conductive material and, during charge or discharge of said cell, polysulfide salts of said alkali metal which at least partially fill said porous conductive material, said material being in contact with both said cation-permeable barrier and said external circuit. Still more preferably, the reaction zones and the barrier are concentrically disposed with respect to each other within the cell. Most preferably the reaction zones and the barrier are tubular and concentrically disposed.

Improvement of the Invention

The improved cells or batteries in accordance with the invention serve to overcome difficulties caused by formation of elemental sulfur on the porous electrode surface near the solid ceramic electrolyte. The improvement of the invention, as mentioned previously, is based on the principle that the addition of a third substance to a system of two partially miscible liquid components increases the mutual solubility of the two components if the added substance dissolves in both liquids. The improvement comprises increasing the charge/discharge capacity of the battery or cell by the dissolving in the cathodic reactant thereof an additive from the group consisting of: (1) elements which will react with molten sulfur to form polysulfide salts which are soluble in and form a liquid solution with both molten sulfur and molten polysulfide salts of the alkali metal anodic reactant, e.g., sodium; (2) polysulfide salts of said elements, which salts are soluble in and form a liquid solution with both molten sulfur and said molten polysulfide salts of said alkali metal anodic reactant; and (3) mixtures of said elements and polysulfide salts. Since the additive is soluble in both molten sulfur and molten alkali metal polysulfide salts, these two reactant components show increased mutual solubility. As a result, elemental sulfur does not form at the porous electrode surface near the solid electrolyte during charging and the battery or cell can be recharged much more efficiently than prior art devices.

While any element or polysulfide thereof meeting the above requirements may be employed to increase the mutual solubility of sulfur and alkali metal polysulfide, the preferred additives are those selected from the group consisting of arsenic, phosphorus, polysulfide salts of arsenic and phosphorus, and mixtures thereof. These additives are generally dissolved in the cathodic reactant of the battery or cell, which has an operating temperature of between about 300° C and about 400° C, in such an amount that the reactant contains between about 5 and about 25 atom percent of arsenic or phosphorus based on the total atoms of said additive element and sulfur in the reactant. It will be understood that the range of 5 to 25 atom percent is a preferred range and is not intended to be limiting. As will be discussed below, each of the preferred additives may be employed in varying amounts outside the preferred range.

Of the preferred additives discussed above the most preferred are those selected from the group consisting of arsenic, polysulfide salts of arsenic and mixtures thereof. If the elemental form of arsenic is added to the molten sulfur cathodic reactant, it will react with sulfur to form polysulfide salts. Alternatively, polysulfide salts of arsenic such as arsenic trisulfide ($As_2S_3$) and arsenic pentasulfide ($As_2S_5$) may be added to the melt or mixtures of the salts and/or the element may be added. The liquidus temperatures for arsenic-sulfur compositions are below 320° C for arsenic contents up to 50 atom percent based on the total atoms of arsenic and sulfur in the composition. Thus, the arsenic and/or arsenic polysulfide additive may be employed in any amount up to about 50 atom percent arsenic.

When arsenic or arsenic polysulfide salts are employed as additives, it is also desirable to dissolve in the cathodic reactant, in addition to the additive, between about 0.5 and about 10, preferably about 3, atom percent of thallium based on the total atoms of thallium and sulfur in the reactant. The addition of this element in the amount specified serves to reduce the viscosity of the cathodic reactant, thereby promoting flow of reactant and mixing of sulfur and alkali metal polysulfide.

The other preferred additive includes those selected from the group consisting of phosphorus, polysulfide salts of phosphorus and mixtures thereof. If the elemental form of phosphorus is added to the molten sulfur cathodic reactant, it will react with sulfur to form polysulfide salts. Alternatively, polysulfide salts of phosphorus such as phosphorus trisulfide ($P_4S_3$), phosphorus pentasulfide ($P_4S_5$ or $P_4S_{10}$) or phosphorus hepasulfide ($P_4S_7$) may be added to the melt or mixtures of the salts and/or the element may be added. The liquidus temperatures for phosphorus-sulfur compositions are below 320° C for phosphorus contents up to 67 atom percent phosphorus based on the total atoms of phosphorus and sulfur in the composition. Thus, the phosphorus polysulfide may be employed in any amount up to about 67 atom percent phosphorus.

By employing the improvement of this invention it is possible to eliminate or substantially reduce the formation of elemental sulfur on the porous electrode of the cell or battery during the charging cycle. As mentioned previously, when the alkali metal/sulfur cells or batteries to which the improvement of this invention applies are at least partially discharged, the cathodic reactant contains alkali metal (e.g., sodium) polysulfide salts. The arsenic/sulfur and phosphorus/sulfur compositions are soluble in such alkali metal polysulfide melts, forming compounds such as thioarsenites and tetrathiophosphates. Thus, during the recharging cycle of a sodium/sulfur cell or battery elemental sulfur which is formed at the electrode surface is more readily removed from the electrode by its dissolution in the sodium thioarsenite/polysulfide or tetrathiophosphate/polysulfide melt.

The invention will be more fully understood from a reading of the following examples in conjunction with the drawing.

EXAMPLE I

A sodium/sulfur cell of the type shown in the drawing is prepared. The cell shown is a test cell generally indicated at 2. The cell is prepared in pyrex container 4 and includes a tubular conductive ceramic 6 which is sealed to a tubular nonconductive alpha alumina ceramic 8 by glass seals 10. The alkali metal reactant-anode sodium 12 is contained within the tube formed of ceramic 6 and 8. Lead 28 is immersed in sodium 12 and is connected to an external circuit. Porous graphite electrode 14 is shown immersed in cathodic reactant 26 to the level indicated.

Since the illustrated cell is prepared in a glass container (an insulator) to avoid corrosion problems, the container cannot be used as an electrode. Thus, it is necessary to insert a cathode into each cell. The electrode shown comprises a graphite rod 18 which is in electrical contact with a machined graphite block 20 which in turn is in electrical contact with graphite felt 14. The electrode structure shown also includes a graphite thread reference electrode 22 which is separated from tube 18 by a pyrex tube 24. This reference electrode is merely included for testing purposes.

In accordance with the improvement of this invention cathodic reactant 26 is prepared by melting together sulfur, arsenic and or arsenic trisulfide in such an amount that the arsenic comprises 20 atom percent of the composition. The resultant composition is then added to the cathodic reaction zone via a filler arm, not shown and the cell evacuated.

The above cell including the arsenic additive demonstrates an excellent charge/discharge capacity.

EXAMPLE II

The cell shown in the drawing and described above with the exception that the porous electrode 14 is inserted in slabs or sections and the additive is sprinkled in powder form between the various sections or slabs as they are inserted. The molten sulfur is then added to the cathode reaction zone through a filler arm, not shown.

In view of the disclosure, many modifications of this invention will be apparent to those skilled in the art. It is intended that all such modifications which fall within the true scope of this invention be included within the terms of the appended claims.

I claim:
1. In a secondary battery or cell comprising:
   A. One or more anodic reaction zones containing a molten sodium reactant-anode in electrical contact with an external circuit;
   B. one or more cathodic reaction zones containing (i) a cathodic reactant which, when the battery or cell is at least partially discharged, is selected from the group consisting of (a) a molten sodium polysulfide salt and (b) a composition comprising molten sulfur and molten sulfur saturated sodium polysulfide salts and (ii) an electrode of porous conductive material which is at least partially immersed in said cathode reactant, and
   C. a solid electrolyte which is a cation-permeable barrier to mass liquid transfer interposed between and in contact with said anodic and cathodic reaction zones, said porous conductive material being in electrical contact with both said cation-permeable barrier and an external circuit,
   wherein the improvement comprises increasing the charge/discharge capacity of said battery or cell by dissolving in said cathodic reactant an additive selected from the group consisting of: (1) arsenic and phosphorus; (2) polysulfide salts of arsenic and phosphorus; and (3) mixtures of (1) and (2), said additive being dissolved in such an amount that said cathodic reactant contains between about 5 and about 25 atom percent of arsenic and/or phosphorus based on the total atoms of said additive element or elements and sulfur in said reactant.

2. A device in accordance with claim 1 wherein said additive is selected from the group consisting of arsenic, polysulfide salts thereof and mixtures thereof, said additive being dissolved in said cathodic reactant in such an amount that said reactant contains up to 50 atom percent of arsenic based on the total atoms of arsenic and sulfur in said reactant.

3. A device in accordance with claim 2 wherein said improvement also comprises dissolving in said cathodic reactant, in addition to said additive, between about 0.5 and about 10 atom percent of thallium based on the total atoms of thallium and sulfur in said reactant.

4. A device in accordance with claim 3 wherein said thallium is dissolved in the amount of about 3 atom percent.

5. A device in accordance with claim 2 wherein said polysulfide salts are selected from the group consisting of arsenic trisulfide, arsenic pentasulfide and mixtures thereof.

6. A device in accordance with claim 1 wherein said additive is selected from the group consisting of phosphorus, polysulfide salts thereof and mixtures thereof, said additive being dissolved in said cathodic reactant in such an amount that said reactant contains up to 67 atom percent of phosphorus based on the total atoms of phosphorus and sulfur in said reactant.

7. A device in accordance with claim 6 wherein said polysulfide salts are selected from the group consisting of phosphorus trisulfide, phosphorus pentasulfide and phosphorus heptasulfide.

* * * * *